United States Patent [19]
Hirabayashi

[11] Patent Number: 6,085,422
[45] Date of Patent: Jul. 11, 2000

[54] MULTIFUNCTIONAL TOOL

[75] Inventor: Shigeru Hirabayashi, Matsumoto, Japan

[73] Assignee: Izumi Products Company, Nagano, Japan

[21] Appl. No.: 09/055,227

[22] Filed: Apr. 6, 1998

[30] Foreign Application Priority Data

Dec. 18, 1997 [JP] Japan .................................. 9-348896

[51] Int. Cl.⁷ ..................................................... B25F 3/00
[52] U.S. Cl. ................................................. 30/122; 30/94
[58] Field of Search ............................... 30/122, 94, 205, 30/206, 264, 362, 95, 97; 83/698.91, 699.11; 7/157; 81/180.1, 181, 185.1, 185.2

[56] References Cited

U.S. PATENT DOCUMENTS

| | | | |
|---|---|---|---|
| 252,749 | 1/1882 | Fenton | 30/94 |
| 481,168 | 8/1892 | Ellis | 30/122 |
| 4,174,646 | 11/1979 | Kotler | 30/122 |
| 5,598,635 | 2/1997 | Saito | 30/362 |

FOREIGN PATENT DOCUMENTS 8-141942  6/1996  Japan .

*Primary Examiner*—Hwei-Siu Payer
*Attorney, Agent, or Firm*—Liniak, Berenato, Longacre & White

[57] ABSTRACT

In an attachment to a multifunctional tool, comprising a construction that frames are projected on a cylinder head, a yoke having a fixed die and a latch are pivotally supported by the frames, and a movable die is fitted to the piston head opposite to the fixed die, or frames are projected on a cylinder head of the body of the tool, two props are pivotally supported by the frames, and working parts of the tool are pivotally attached to the two props, sliding grooves are formed on inside surfaces of the yoke and latch and, the attachment possesses a mechanism for attaching or detaching auxiliary dies to inside surfaces of the fixed die and movable die, or the attachment is attached to inside surfaces of the both props pivotally supported by the frames at the position of the piston head; sliding grooves are formed on the inside surfaces of the props to make a movable die slide by being linked to the slide of the piston head; and the attachment possesses a link mechanism which is in contact with a contact surface residing on the inside of the movable die, and is linked to the working parts of the tool to drive the working parts of the tool according to the slide of the movable die.

1 Claim, 6 Drawing Sheets

MULTIFUNCTIONAL TOOL

BACKGROUND OF THE INVENTION

1. Field of the Invention

The present invention relates to improvement of a multifunctional tool mainly used for compressing and crimping terminals or sleeves so as to connect adjacent ends of cables and available for multifunctional operations.

2. Prior Art

As a treatment of a cable terminal, a specialized pressure connecting tool or a specialized compression tool has hitherto be utilized. Similarly, a specialized tool to meet a desired application has been utilized, as a cutter for iron reinforcing rod has been used for cutting an iron reinforcing rod or capper wires, a head screw cutter has been used for cutting a head screw, and a cable cutter has been used for cutting a cable.

However, in the same working site, various operations such as cable terminal treatments, inclusive of pressure connecting or compression of cables, cutting a head screw, as well as cutting an iron reinforcing rod, are sometimes required. To have all of the various tools is disadvantageous not only in terms of a heavy economic burden on a worker, but also in terms of the difficulty to handle these tools in the case of transporting these tools.

In order to solve the problems, we have filed a patent application, entitled "hydraulic multifunctional tool" as patent Application Ser. No. 6-280756 (corresponding to Japanese Unexamined Patent Publication No. 8-141942).

In the hydraulic multifunctional tool disclosed therein, a detachable, specialized working attachment is inserted into an edge portion at one side of the cylinder of the hydraulic tool to meet the aimed treatment, making it possible to perform the aimed treatment only by one tool. As a result, the conventional problems concerning the economic burden on a worker and difficulty to handle the tools can be solved.

Here, the features of the hydraulic multifunctional tool disclosed therein will now be briefly described. In the hydraulic multifunctional tool, a working attachment especially for the purpose of treatment of cable terminal, cutting a head screw or cutting an iron reinforcing rod is attached.

FIG. 5 shows the hydraulic multifunctional tool to which an attachment to a cable cutter is attached, and FIG. 6 shows the hydraulic multifunctional tool to which an attachment for punching a steel plate is attached.

A body T' of the hydraulic multifunctional tool shown in FIG. 3 to FIG. 6 possesses frames 1'a and 1'b which divide a cylinder head 1' into two portions. To the frames 11a and 11b making a two divided shape, a detachable, specialized attachment for a given work is attached to meet the given work.

A detachable, movable attachment is attached to a front end of a piston head 21 of the body T' opposite to the working attachment. A yoke 4' of the working attachment formed into an L-shape, which can revolve, is pivotally supported by the frame 1'b which is one frame of the frames 11a and 11b making a two divided shape, and a latch 31, which can be abutted on the yoke 41, is pivotally supported by the frame 1'a which is another frame of the frames 1'a and 1'b through slide pins 61 and 5', respectively.

Onto the base end of the yoke 4' is formed a spring 4'b which applies a spring force to the yoke 41 in the direction of opening the yoke 4' (see FIG. 3B), and onto the base end of the latch 31 is formed a spring 3'b which applies a spring force to the latch 31 in the direction of closing the latch 3' (see FIG. 3B), respectively.

To the front end of the piston head 2' and the yoke 4' side, a detachable female die 12' and a detachable male die 11', which are used for pressure connecting or compression treatment of a terminal, are attached, respectively.

Exchange or attaching of each working attachment to the hydraulic multifunctional tool T' having such features are carried out as follows:

First, by pushing up the latch 3' against a spring force of the spring 3b' which is equipped to the base end thereof, the abutting of the latch 3' on the yoke 4' is released, whereby the yoke 41 automatically revolves by a so-called one touch operation by means of a spring force of the spring 4b' fitted to the base end of thereof. By the one-touch operation which pushes up the latch 3', the yoke 4' leaves from the latch 3' to be in an open state in which the working attachment can be attached or exchanged.

Subsequently, after the attaching or exchanging the working attachment, when the yoke 4' revolves toward the direction to be closed (direction to latch 3') against a spring force of the spring 4b' thereof to be in contact with the latch 31, the latch 3' is pushed up against a spring force of the spring 3b', after which the latch 3' and the yoke 4' are abutted on each other. In other words, by the one-touch operation of pushing up the yoke 4', the yoke 4' is abutted on the latch 3' to become a closed state in which a required work can be carried out.

When the male die 11' is attached to a front end of the piston head 2' for example through a die 10' for adjusting a stroke end and the female die 12' is attached to the yoke 4', crimping operation may be carried out.

The die 10' for adjusting a stroke which is attached in order to shorten the stroke of the piston head 2' will be described.

The die 10' for adjusting a stroke shown herein has a shank 10'a which is attachable and detachable to the piston head 2' is provided on the base end thereof, and at a portion opposite thereto, a portion 10'b for attaching a die having a ball plunger built therein is provided by which the shank 11'a of the male die 11' can be attached or detached. In this case, it is so set up that the length of the die 10' for adjusting a stroke to be fitted to the piston head 21 corresponds to the length of shortening the piston stroke.

The hydraulic tool described above can be used for carrying out a treatment of an aimed application by one hydraulic tool through exchanging or attaching an aimed working attachment to the yoke 4 and the piston head 2' of the frames 1'a and 1'b of the body T' of the hydraulic multifunctional tool, but it has the following problems:

(1) Since the conventional hydraulic tool which is specially used for pressure connecting and compressing a cable terminal is not produced for the purpose of treating a wide variety of applications from the first, the frames of the hydraulic tool do not have such a frame construction that a wide variety of working attachments can be attached. Accordingly, the portion where the attachment to the cylinder head is attached should be remolded. At the same time, as for the die 10' for adjusting a stroke which is fitted to the male die for adjusting a stroke to be fitted to a front end of the piston head 21, the remolding of the piston head 2' is required. Moreover, the operation of attaching or exchanging is significantly ineffective.

(2) When the male die 11' advances forward to clamp a substance to be pressed such as a cable together with the female die 12', frames 1'a and 1'b are sometimes deformed depending upon the load to be applied from the constructional view point.

SUMMARY OF THE INVENTION

In light of the above circumstances, there is an object to provide a multifunctional tool available for various cable laying operations such as from compressing operation of terminals or sleeves to cutting operation of cables. In this multifunctional tool, various operations can be carried out merely by replacing attachments for desired operations.

According to the present invention, there is provided a multifunctional tool comprising:

a tool body including a piston;

a die fixed to a front end of the piston;

a compression attachment mainly used for compressing cable connecting terminals and having a die; and a cutting attachment mainly used for cutting operation of cables and having movable blades and a link mechanism for operating the movable blades, the compression attachment and the cutting attachment being alternatively mounted to the tool body, wherein a work is compressed between the dies provided at the piston and the compression attachment by the advance movement of the piston in the case of mounting said compression attachment, and wherein a work is cut between the movable blades, which are moved by the link mechanism operable by the advance movement of the piston, in the case of mounting said cutting attachment.

BRIEF DESCRIPTION OF THE DRAWINGS

FIG. 3 shows an explanatory view of the conventional attachment for treating a cable terminal to be used for the conventional hydraulic tool, wherein

PREFERRED EMBODIMENTS OF THE INVENTION

Embodiments of a multifunctional tool according to the present invention having such a construction will now be described by referring to the attached drawings.

In the description described hereinafter, the same parts and the same members as those used in the conventional embodiment described above are symbolized to the same symbols, and the repetition explanation is omitted.

Figure 1:
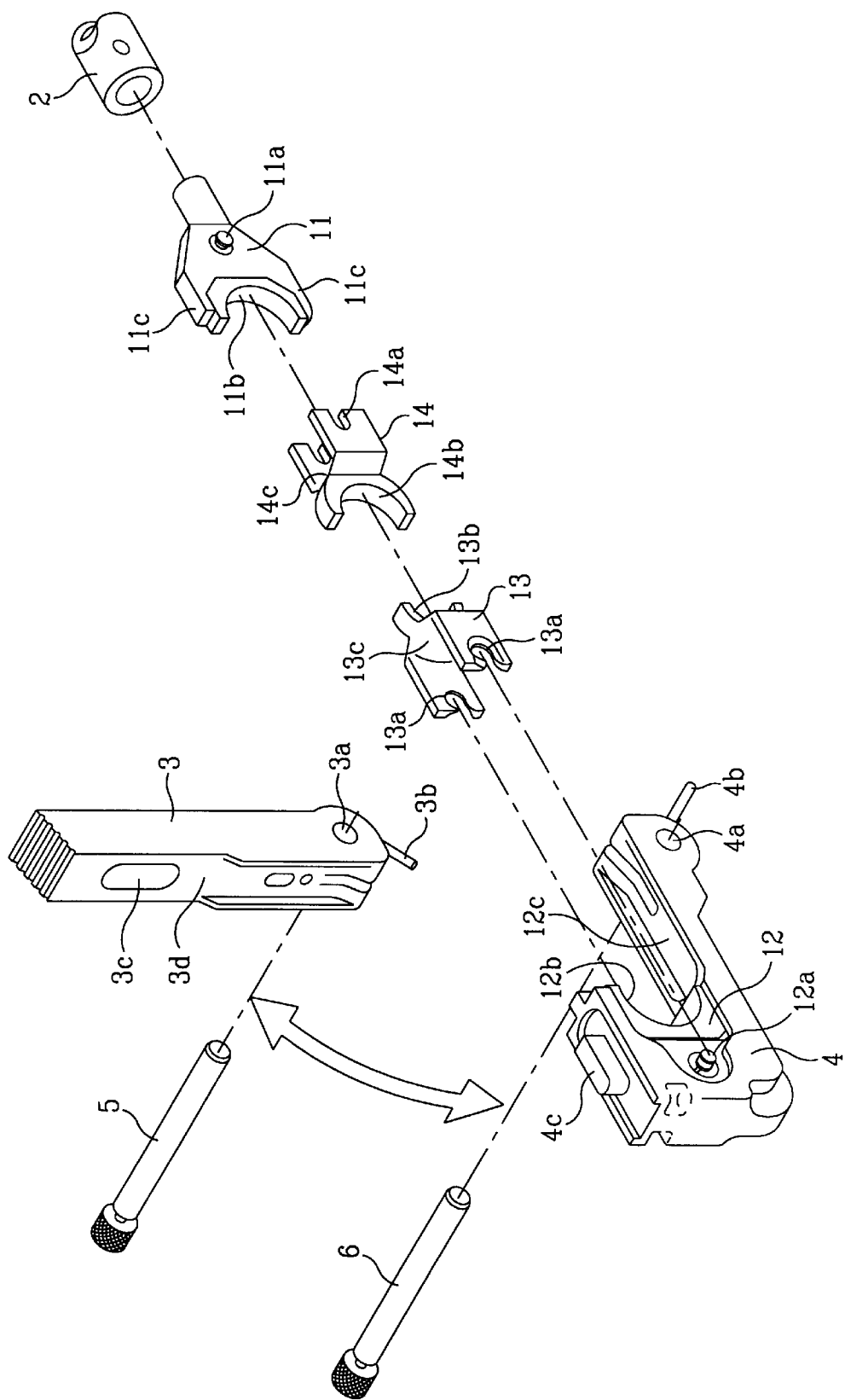
FIG. 1 shows a first embodiment of a multifunctional tool according to the present invention, in which an attachment for compressing a cable terminal is shown by an exploded perspective view.
Figure 5:
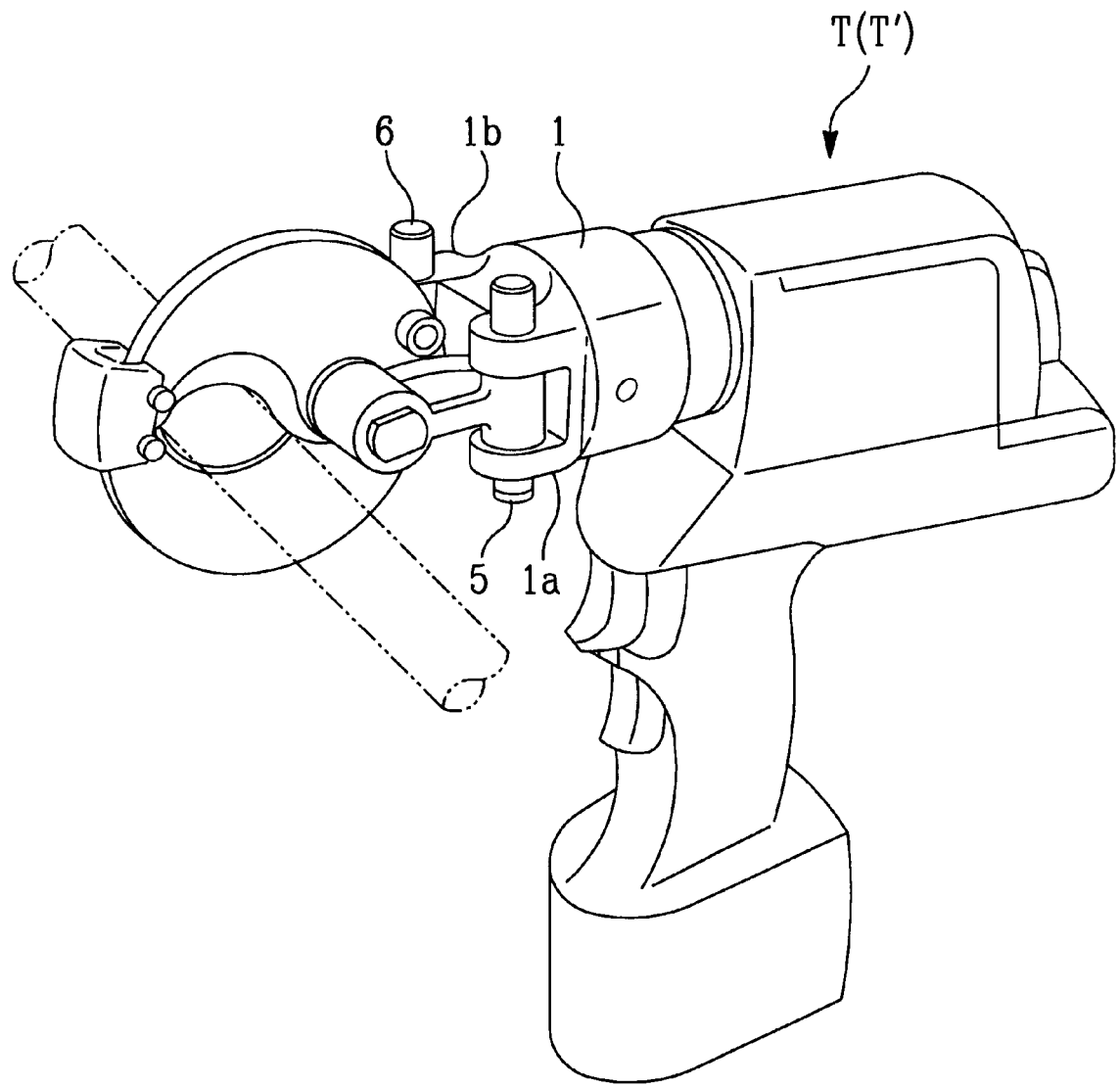
FIG. 5 is a perspective view totally showing the conventional hydraulic multifunctional tool to which an attachment for cutting a cable is attached.
Figure 6:
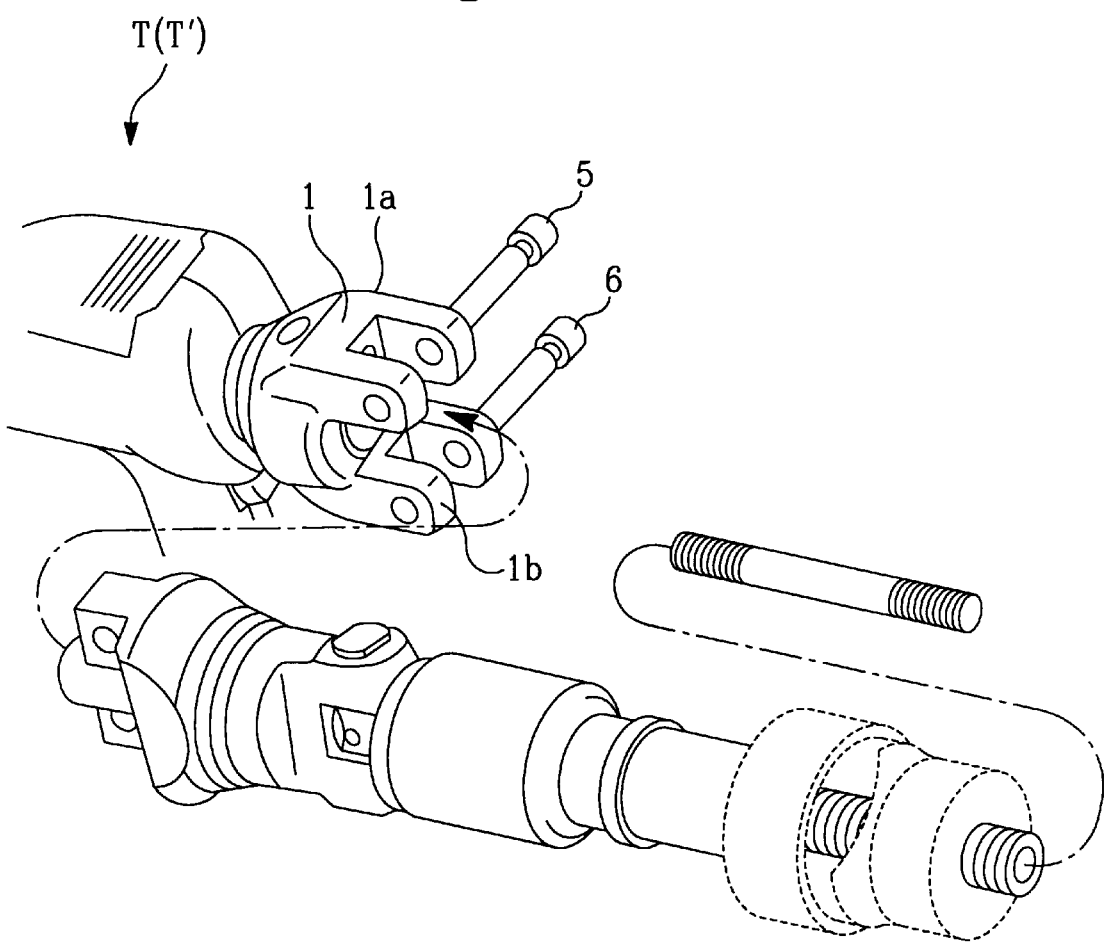
FIG. 6 is a perspective view totally showing the conventional hydraulic multifunctional tool to which an attachment for punching a steel plate is attached.

FIG. 1 shows an attachment of a multifunctional tool for compressing a cable terminal. Construction of this compression attachment will be described below. Frames 1a and 1b are projected on the cylinder head 1 of the body T of the multifunctional tool (see FIGS. 5 and 6). A yoke 4 having an L-shape as shown in FIG. 1, which can revolve, a latch 3, which can be abutted on the yoke 4, are pivotally supported by the insertion of slide pins 5, 6 through revolving openings 3a, 4a.

A die 12 as a fixed die is fitted to the L-shaped yoke 4. Opposite to the die 12 and at a front end of the piston 2 of the body T of the multifunctional tool, a die 11 as a movable die is fixed to the piston 2.

Sliding grooves 3d and 12c which make a sliding portion 11c of the die 11 slide are formed on inside surfaces of the yoke 4 and the latch 3, respectively. By the virtue of the sliding grooves 3d and 12c, the die 11 can smoothly slide and a damage of the yoke 4 and the latch 3 can be prevented even when the yoke 4 and the latch 3 are strongly deformed according to the slide of the piston 2.

Auxiliary dies 13 and 14 can be attached to inside surfaces of the die 12 and the die 11. These auxiliary dies 13 and 14 are used for the purpose of compressing a terminal or a sleeve having a diameter smaller than that of a terminal or a sleeve of cable to be treated by the die 11 and the die 12.

In attaching the auxiliary dies 13 and 14 to the die 12 and the die 11, the attachment is conducted by means of a mechanism for attaching or detaching the auxiliary dies.

As shown in FIG. 1 the mechanism for attaching or detaching the auxiliary dies comprises push pins 11a, 12a, which project on both sides of the yoke 4 and die 11, and the auxiliary dies 13 and 14. The push pins 11a and 12a have a construction where a collar is externally equipped and a return spring is accommodated. Contact surfaces 13c, 14c are made on the auxiliary dies 13, 14 in opposing relation to the holding surfaces 13b, 14b thereof. A work is held between the holding surfaces 13b, 14b of the auxiliary dies 13, 14. At the same time, abutting pores 13a and 14a are perforated through the both side of the auxiliary dies 13 and 14, whereby the auxiliary dies 13 and 14 becomes detachable through the push pins 11a and 12a, respectively.

Functions of the multifunctional tool with the aforementioned attachment mounted will now be described.
[Attachment of Auxiliary Dies] (see FIG. 1)

First, when the yoke 4 and the latch 3 are in the closed state, a front end of the latch 3 is pushed up by a finger. The latch 3 revolves on the slide pin 5 as a fulcrum to be pushed up against a spring force of the spring 3b. The projecting member 4c for abutting the yoke 4 is out of the abutting pore 3c. The yoke 4, therefore, automatically revolves to the direction of the opened state (downward direction of the arrow on the drawing). While the yoke 4 and the latch 3 are disengaged (open state), the auxiliary dies 13, 14 are attached.

The yoke 4 is then moved (upward direction of the arrow in the drawing) with its corner pushed up toward the latch 3 so as to engage with the latch 3, whereby the yoke 4 revolves on the slide pin 6 as a fulcrum against a spring force of the spring 4b. The projecting member 4c for the abutting the yoke 4 is abutted on the pore 3c for abutting the latch 3. Both the yoke 4 and the latch 3 are therefore kept in the closed state.

Replacement of other auxiliary dies used for different cables is carried out by the above procedure. Since disengagement or engagement of the yoke 4 and the latch 3 is carried out by one-touch operation, simple and rapid replacement of the auxiliary dies is available, thereby leading to improved working efficiency. [Function of Treating Substance to be Treated by Movable Die]

After the yoke 4 and the latch 3 are engaged (closed state), a hydraulic pump not shown is driven to make the piston advance forward and clamp a substance to be treated (work) between the holding surfaces 11b, 12b of the die 12 and the die 11, to thereby carry out a prescribed treatment. Depending on the diameter of the substance to be treated, the treatment can be carried out after attaching the auxiliary dies 13 and 14 to the die 12 and die 11, respectively by means of a mechanism for attaching or detaching the auxiliary dies.

The die 11 slides according to the advance of the piston 2 and, at this time, the die 11 makes the sliding portion 11c slide within the sliding grooves 3d and 12c, which are formed on the inside surfaces of the yoke 4 and the latch 3, respectively, as tracks.

By the slide of the die 11 within the sliding grooves 3d and 12c as tracks, the die 11 is smoothly slidable. Furthermore, even if strong deformation of the yoke 4 and the latch 3 is brought about according to the function of the piston 2, the damage of the yoke 4 and the latch 3 can be prevented.

Figure 2:
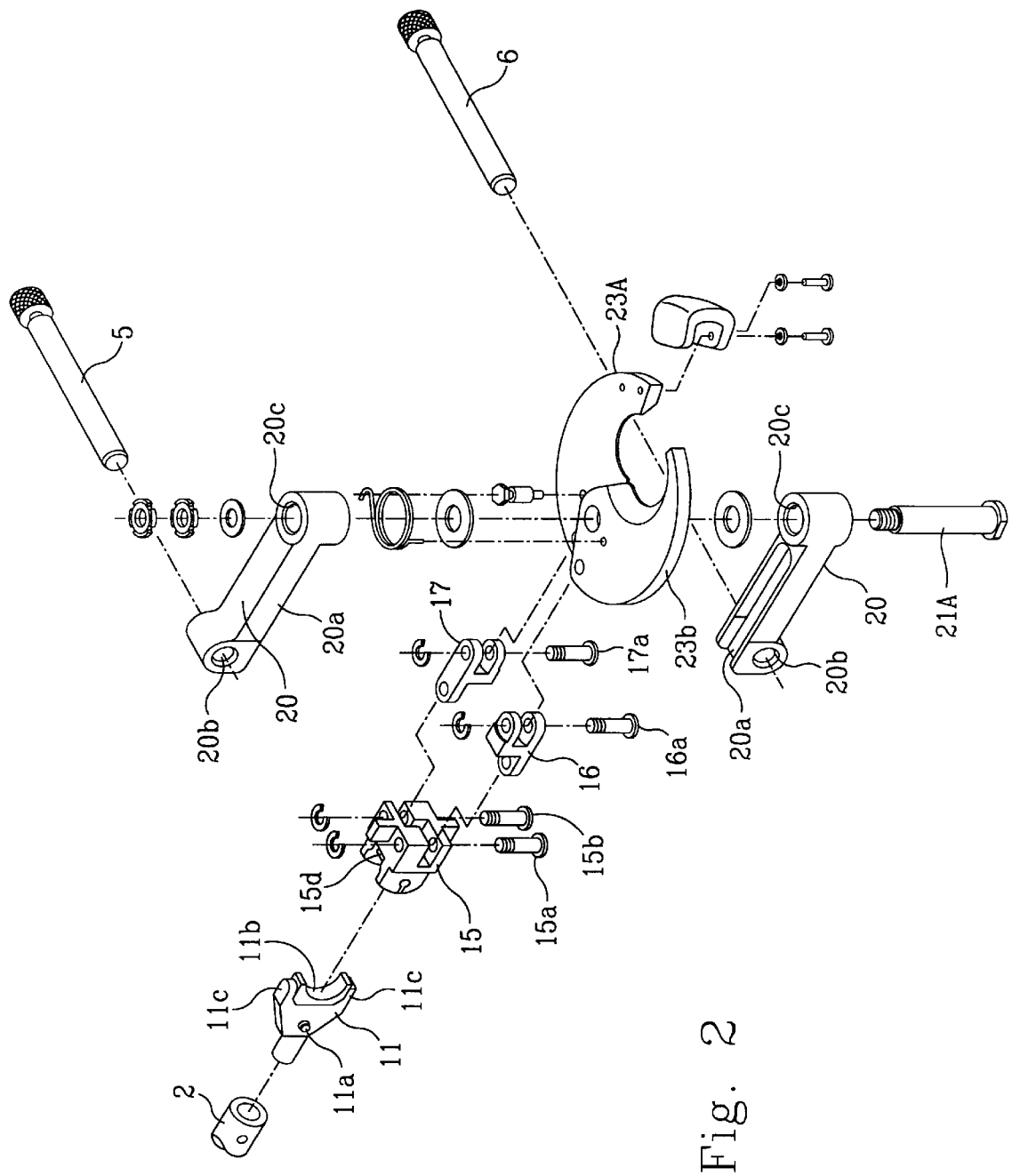
FIG. 2 shows a second embodiment of a multifunctional tool according to the present invention, in which an attachment for cutting cables is shown by an exploded perspective view.
Figure 3A:
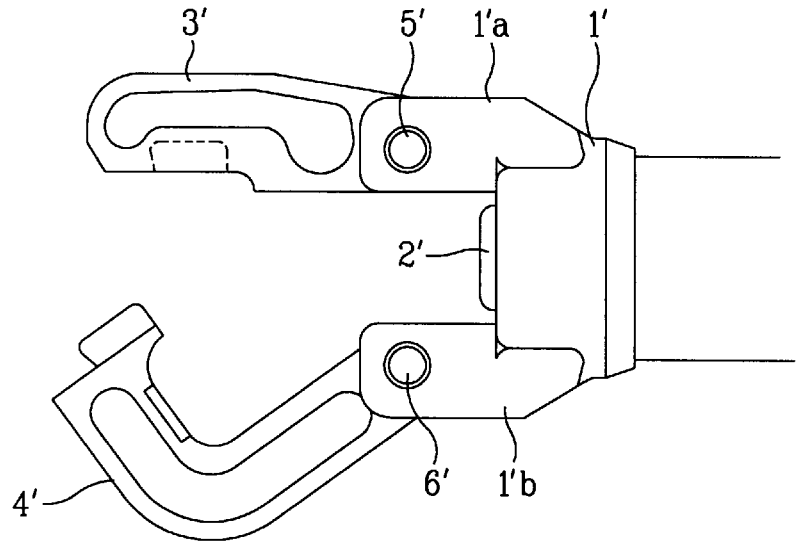
FIG. 3A is a side view thereof and FIG. 3B is an exploded perspective view thereof.
Figure 3B:
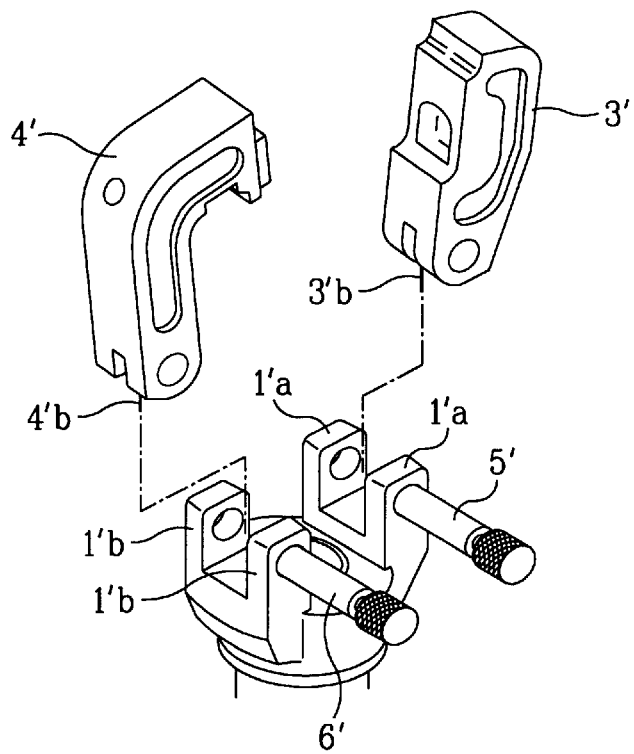
Figure 4A:
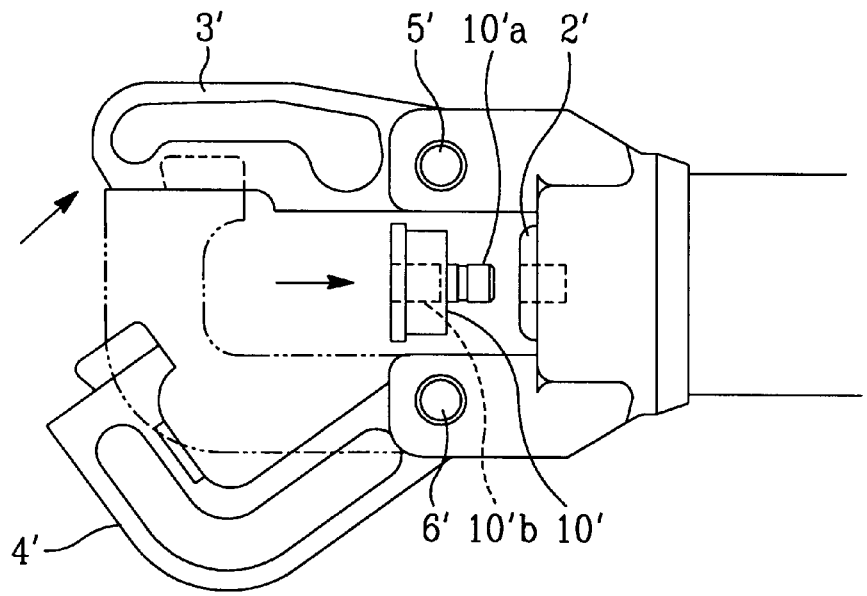
FIG. 4A is an explanatory view showing the attaching of a male die to the piston head of the hydraulic multifunctional tool of FIG. 3.
Figure 4B:
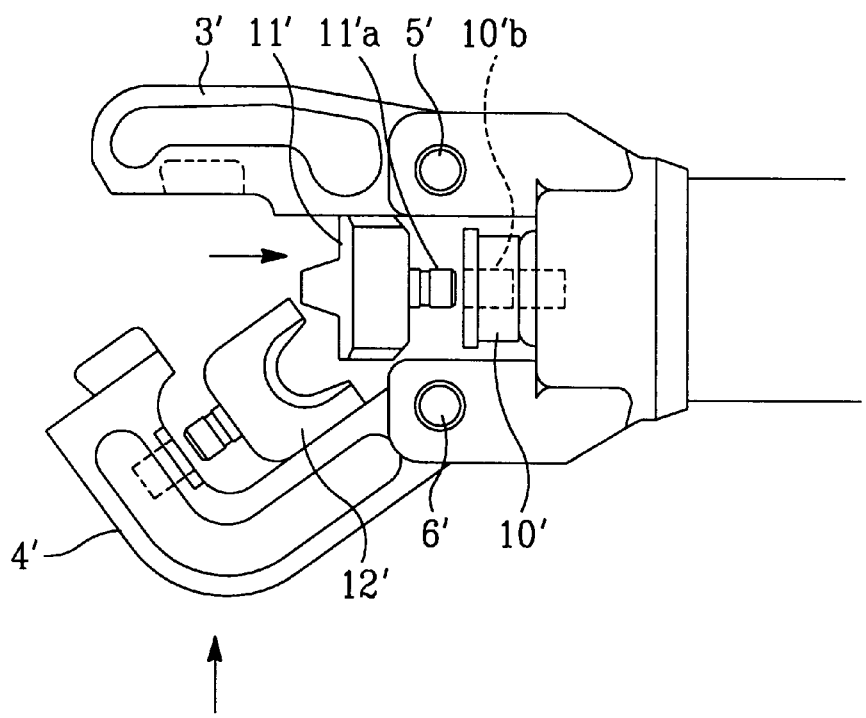
FIG. 4B is an explanatory view showing the attaching of a female die.

FIG. 2 shows an attachment of a multifunctional tool for cutting cables. Construction of this cutting attachment will be described below.

To be specific, to the cylinder head 1 of the body T of the multifunctional tool (see FIGS. 5 and 6), frames 1a and 1b are projected. Two props 20 and 20 which can revolve are removably supported by these frames 1a and 1b by inserting slide pins 5 and 6 into revolving pores 20b and 20b as shown in FIG. 2. Insert pores 20c and 20c are pierced through another ends of these two props 20 and 20, respectively, and movable blades 23A, 23B for cutting operation are pivotally supported by means of a shoulder bolt 21A.

The attachment for a cutter is mounted between the two props 20 and 20 in such a way that the two movable blades 23A, 23B are pivotally supported by the shoulder bolt 21A, thereby providing an intersecting mechanism.

The die 11 is integral with a front end of the piston 2 of the body T of the multifunctional tool. A slide base 15 and a link mechanism 16, 17 are synchronized in movement with the sliding movement of the piston 2.

Sliding groove 20a which allows a sliding portion 11c of the die 11 to slide are formed on inside surfaces of the two props 20 and 20. By the virtue of the sliding grooves 20a and 20a, the die 11 can smoothly slide and the damage of these two props 20 and 20 can be prevented even if the two props 20 and 20 are strongly deformed according to the slide of the piston 2.

The slide base 15 is detachably mounted to the die 11 with the slide base 15 abutting to the inner surfaces of the die 11. The slide base 15 is moved by the advancing and retracting movement of the die 11 through the piston 2, thereby providing a mechanism converting the sliding movement of the die 11 into the movement of the intersecting mechanism for the cable cutter attachment.

The link mechanisms 16 and 17 are constructed in a series form in such a manner that the link mechanisms 16 and 17 are pivotally supported by means of supporting bolts 15a and 15b in the form of being connected to the slide base 15, and the link mechanisms 16 and 17 are connected to the movable blades 23A and 23B by supporting bolts 16a and 17a.

Functions of the multifunctional tool with the aforementioned attachment mounted will now be described.

In the case where the latch 3 and the yoke 4 are attached to the cylinder head prior to attaching the attachment to a cable cutter to the body T of the multifunctional tool, the slide pins 5 and 6 shown in FIG. 1 are pulled out.

Subsequently, the slide base 15 is inserted so as to abut its contact surface 15d to the holding surfaces 11b of the die 11. The die 11 is fixed to the front end of the piston 2.

By driving a hydraulic pump not shown, the piston 2 and the die 11 slide forward. According to this sliding movement, the slide base 15 and the link mechanisms 16 and 17 are acted whereby the intersecting mechanism of the two movable blades 23A and 23B cut a cable.

The multifunctional tool according to the present invention constructed as described above has the following advantageous effects:

In the multifunctional tool according to the present invention, since both compression attachment and cutting attachment are formed to correspond to the die fixed to the piston of the tool body, replacement of the compression attachment and the cutting attachment is carried out without detaching the die from the piston.

In a conventional multifunctional tool, since the die to be mounted to the piston is merely corresponding to the die of the compression attachment but not to the die of the cutting attachment, the die should be removed from the tool body when the cutting attachment is mounted to the tool body in place of the compression attachment. Contrary, when the compression attachment is mounted to the tool body in place of the cutting attachment, the die should be mounted again to the tool body.

According to the present invention, since the replacement of the attachments is carried out without detaching the die from the tool body, improved working efficiency is achieved.

What is claimed is:

1. A multifunctional tool comprising:

a tool body including a piston;

a die fixed to a front end of the piston;

a compression attachment mainly used for compressing cable connecting terminals and having a die; and a cutting attachment mainly used for cutting operation of cables and having movable blades and a link mechanism for operating the movable blades, the compression attachment and the cutting attachment being alternatively mounted to the tool body, wherein a work is compressed between the dies provided at the piston and the compression attachment by the advance movement of the piston in the case of mounting said compression attachment, and wherein a work is cut between the movable blades, which are moved by the link mechanism operable by the advance movement of the piston, in the case of mounting said cutting attachment.

* * * * *